Figure 1:
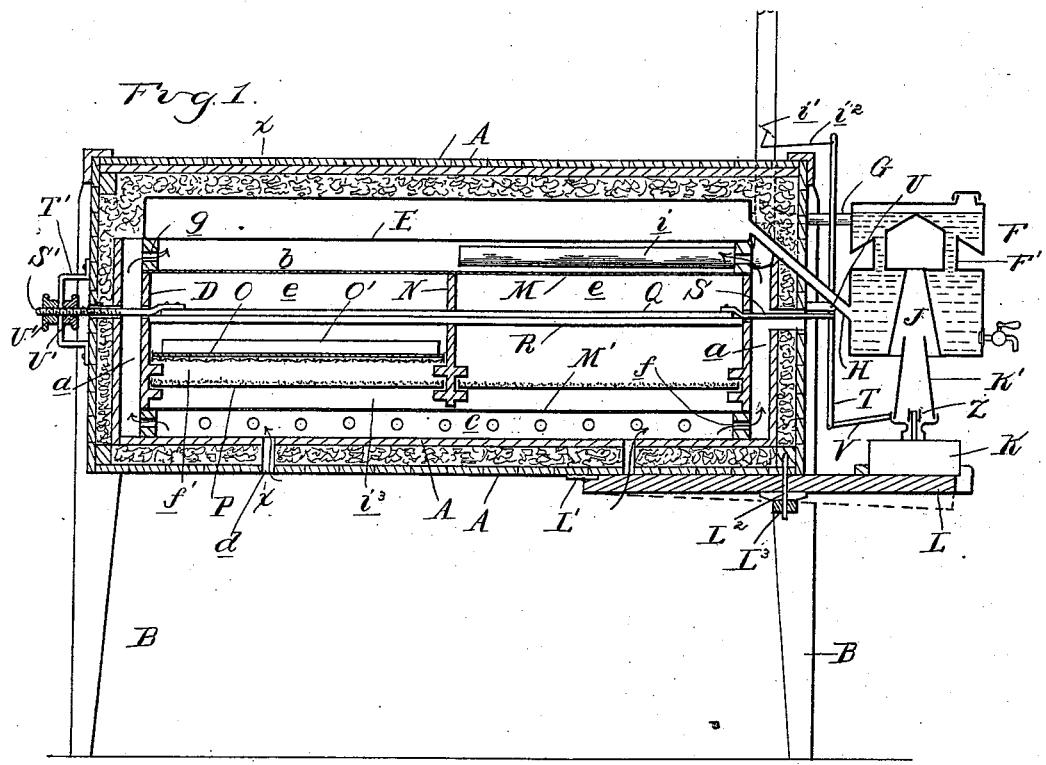

(No Model.) 2 Sheets—Sheet 1.

M. G. BENTON & G. J. NISSLY.
INCUBATOR.

No. 530,676. Patented Dec. 11, 1894.

Inventors
Major George Benton
George J. Nissly

Witnesses (No Model.) 2 Sheets—Sheet 2.
M. G. BENTON & G. J. NISSLY.
INCUBATOR.
No. 530,676. Patented Dec. 11, 1894.
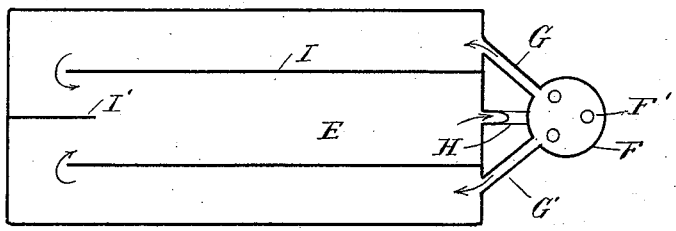
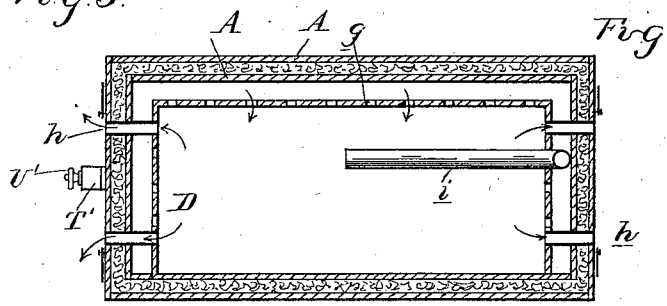
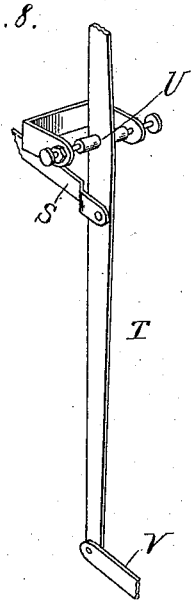
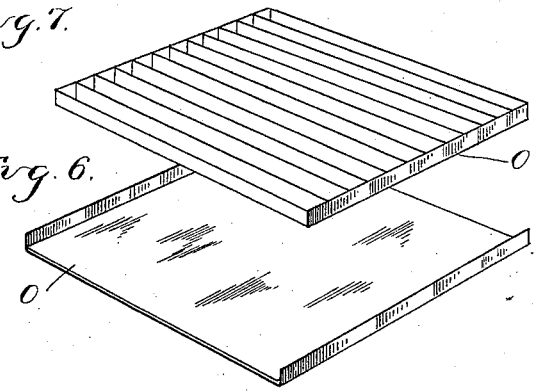
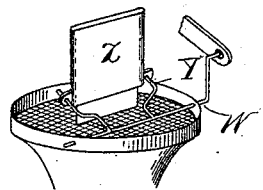
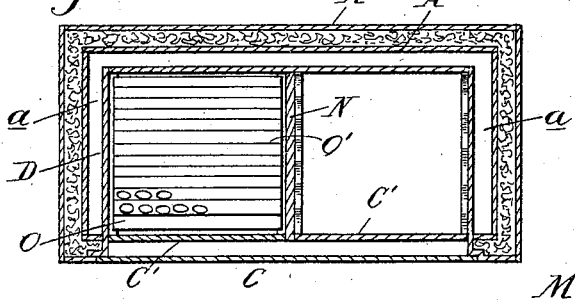
Witnesses
Inventors.
Major George Benton
George J. Nissly
By Thos. J. Sprague
Atty's.

UNITED STATES PATENT OFFICE.

MAJOR GEORGE BENTON, OF COLDWATER, AND GEORGE J. NISSLY, OF SALINE, MICHIGAN.

INCUBATOR.

SPECIFICATION forming part of Letters Patent No. 530,676, dated December 11, 1894.

Application filed March 19, 1894. Serial No. 504,180. (No model.)

*To all whom it may concern:*

Be it known that we, MAJOR GEORGE BENTON, residing at Coldwater, Branch county, and GEORGE J. NISSLY, residing at Saline, county of Washtenaw, State of Michigan, citizens of the United States, have invented certain new and useful Improvements in Incubators, of which the following is a specification, reference being had therein to the accompanying drawings.

This invention relates more specifically to an incubator having an automatic regulator, and it consists in the improved construction, arrangement and combination of different devices whereby a more perfect device is obtained, all as more fully hereinafter described and shown in the drawings, in which—

Figure 2:
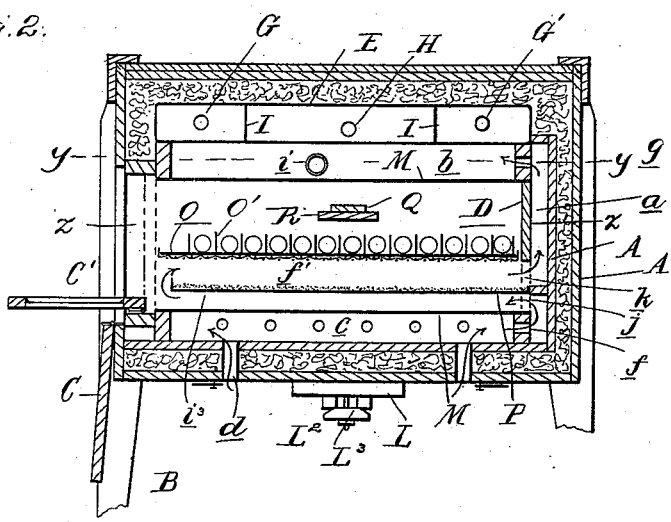

Figure 1 is a vertical, central, longitudinal section of our improved incubator. Fig. 2 is a cross section thereof substantially on line $x—x$ in Fig. 1. Fig. 3 is a horizontal section on line $y—y$ Fig. 2. Fig. 4 is a similar horizontal section through line $z—z$ in Fig. 2. Fig. 5 is a horizontal section through a hot water tank and stove. Fig. 6 is a perspective view of one of the shelves on which the eggs are supported, and Fig. 7 is a detached perspective view of the reticulated frame which in connection with the shelf in Fig. 6 forms the egg tray. Fig. 8 is a detached perspective view of the heat regulating mechanism.

The incubator consists of an outside casing formed with double walls A A, having supporting legs B B and filled in between the walls with mineral wool or other suitable non-conductor of heat. Access is provided into the interior of the outer casing through doors C C' in one side of the casing. The outer door C is hinged near the outer and lower edge of the opening and when open drops down freely on the outside. The inner door C' is preferably made in two sections one for each of the two compartments into which the interior is divided, and they are preferably provided with double glazed panels to permit a full view of the interior through the glass. There is an inner casing D built within the outer casing and one side of this inner casing has an opening corresponding with the opening in the outer casing, and on the other three sides vertical air spaces $a$ are formed between the inner and outer casing. The top of this inner casing is entirely closed by a hot water tank E. This hot water tank communicates with a hot water heater F, placed on the outside, through two outgoing connections G G' from the top of the heater, and a return connection H to the bottom of the heater. The interior of the tank is provided with partitions I I', so arranged that the hot water from the boiler is conducted first into side passages and thence back through a center passage, producing thereby an efficient circulation in the tank.

The heater F is formed with an upper and lower water chamber connected by short vertical tubes F'. The lower water chamber has a central hot air passage J into which extends the chimney of an oil heater K. This oil heater is supported on the end of an arm L which is hinged at L' to the under side of the outer casing, and is supported in position by a hanger $L^2$ passing through the arm and having a turn button $L^3$ on the lower end, all so arranged that by giving this button a greater turn the arm drops down into the dotted position shown in Fig. 1 which permits of removing the lamp. The interior of the inner casing is divided by two horizontal perforated partitions M M' preferably formed of muslin. The partition M is near the top and forms the air space $b$ and the partition M' is near the bottom and forms the air space $c$ in the casing. The space between the partition M M' is further divided by a vertical division wall N into two like compartments $e\ e$ which constitute the egg chambers.

In each egg chamber are two removable trays O P, one above the other and supported on suitable cleats on the side walls. The upper tray O supports the eggs and the lower tray is for keeping moist sand or other moistened material. The tray O consists of a metallic shelf or pan with a reticulated frame O' (Fig. 7) loosely supported thereon. The shelf of the tray has its bottom formed of wire screen or perforated metal covered with a few thicknesses of muslin. The reticulated frame O' which loosely rests on the shelf forms the individual pockets in which the eggs are placed and having no bottom the eggs rest on the shelf below. By this arrangement the eggs can be readily turned in any direction by moving the frame O' on the shelf. The tray P on which the moist sand is placed is constructed in the form of a metal pan preferably divided into compartments, so that the whole or a portion only may be fitted with the moistened sand. The trays O P are readily removable through the opening in the outer casing.

The provision for ventilating is as follows: The lower air chamber $c$ communicates through the inlet opening $d$ in the bottom of the outer casing with the outer air. This air chamber $c$ in turn communicates through air holes $f$ with the air spaces $a$ surrounding the sides of the inner casing. Further, air holes $g$ are provided admitting the air from the top of the air spaces $a$ into the air chamber $b$, and air passages $h\ h$ at the opposite ends of the air space $b$ (shown in Fig. 3) permit the exit of the foul air. The air inlet and outlet openings $d$ and $h$ are provided with regulating slides for adjusting the size of the opening as in the usual manner. A ventilating tube $i$ located near the heater extends into the egg chamber and has a damper $i'$ which is automatically regulated as hereinafter described.

Q is a thermic bar passing centrally through the egg chambers $e\ e$ above the egg trays. This bar extends the whole length of the egg chambers and is loosely supported in position upon a suitable rest R. The end toward the heater is pivotally connected by means of a connecting bar S with the lever T, pivotally secured to the outer casing at U. To the lever end of this lever T is pivotally secured a connecting bar V which engages with the crank arm on the crank shaft W. This crank shaft is journaled in the frame of the burner, as shown in Fig. 8 and has two rock arms Y which loosely carry the vertical sleeve Z which moves freely upon the upper end of the wick tube. To the upper end of the lever T is secured a connecting rod $i^2$ which is pivotally secured at the other end to a crank on the shaft of the damper, all so arranged that the movement of the lever T controls the damper in the ventilating pipe $i$. The opposite end of the thermic bar Q has a screw threaded extension S' which passes through a fixed guide T' on the outside of the casing and two adjusting nuts U' U' hold this end of the thermic bar adjustably connected to the guide. The thermic bar being thus adjusted and arranged is intended to automatically regulate the distribution of the heat and air to the incubator. If the adjustment should be such that when the heat in the incubator rises above the normal heat to be maintained, its expansion operating through the lever T raises the loose sleeve upon the wick tube and thereby diminishes the flame and consequently reduces the heat. At the same time the opposite end of the lever T tends to open the damper in the ventilating pipe $i$. It will be seen that all direct circulation of air is excluded from within the egg chamber proper and thus a sudden chilling of the egg is avoided under all conditions. The muslin forming the top and bottom of the egg chamber however permits a gradual renewal of the air and prevents it from becoming foul. At the same time a sufficient circulation of air takes place in the air chambers surrounding the inner casing, and to maintain such air in moist condition we admit the air into the space $i^3$ beneath the sand tray through suitable air holes $j$. By making the sand tray a little shorter we admit the air around the front edge of the sand tray into the space $i'$ above the sand tray and from there back again through suitable air holes $k$ into the outer space $a$.

The construction of our water heater gives great efficiency. By extending the chimney K' of the oil heater into the central combustion chamber J we apply the heat more directly and prevent loss from radiation, and by making the upper water chamber with a conical raised bottom, we confine the heat more in contact with the heating surfaces. By lowering the bar L the clamp can be readily removed, and in order to adjust it readily in proper relation to the heater, we provide the end of the bar L with a socket to fit the lamp body.

What we claim as our invention is—

1. In an incubator, the combination with the outer casing of an inner casing forming vertical air spaces, a hot water tank on top of the inner casing, an egg chamber in the inner casing, a horizontal cloth partition constituting the top of the egg chamber, and forming between it and the under side of the hot water tank an air space, communicating with the air spaces between the outer and inner casing, substantially as described.

2. In an incubator, the combination with the outer casing, of an inner casing forming vertical air spaces between the walls of the outer and inner casing, a hot water tank on top of the inner casing, an egg chamber in the inner casing below the hot water tank—a cloth partition constituting the top wall of the egg chamber and forming an air space between it and the hot water tank, an egg tray in the egg chamber having a perforated bottom covered with cloth, a sand tray below the egg tray, air spaces being formed above and below the sand tray, and air passages connecting the same with the air spaces between the outer and inner casing, substantially as described.

3. In an incubator, the combination with the outer casing and the egg chamber provided with heating and ventilating devices substantially as described, of the thermic bar Q extending longitudinally through the egg chamber the screw threaded extension S' thereof, the guide T' and adjusting nuts U' the vertical lever T at the end of the casing, the crank shaft W actuated thereby, the wick sleeve Z carried by the crank shaft W, and the damper $i$ connected to and controlled by the lever T all arranged to operate substantially as described.

4. In an incubator, the combination with the outer casing heating tank secured in the top of said casing, of an inner casing, air spaces being formed between the outer and inner casing an egg chamber within the inner casing and perforated partition on top and bottom separating the egg chamber from the air spaces, substantially as described.

In testimony whereof we affix our signatures in presence of two witnesses.

MAJOR GEORGE BENTON.
GEORGE J. NISSLY.

Witnesses to signature of M. G. Benton:
ELMER E. PALMER,
GEO. W. WHITEHEAD.

Witnesses to signature of G. J. Nissly:
JOHN GILLEN,
GEORGE J. FELDKAMP.